(12) United States Patent
Chang

(10) Patent No.: US 6,776,503 B1
(45) Date of Patent: Aug. 17, 2004

(54) THREE-IN-ONE HANDHELD LIGHTING DEVICE

(76) Inventor: Gin-Sung Chang, No. 15, Lane 385, Kuang-Ming Rd., Wu-Jih Hsiang, Taichung Hsien (TW)

(*) Notice: Subject to any disclaimer, the term of this patent is extended or adjusted under 35 U.S.C. 154(b) by 1 day.

(21) Appl. No.: 10/386,280

(22) Filed: Mar. 11, 2003

(51) Int. Cl.⁷ .................................................. F21L 4/04
(52) U.S. Cl. ........................ 362/201; 362/116; 362/253
(58) Field of Search ................................ 362/201, 116, 362/253, 208, 200, 234, 109, 196, 800, 458; 116/2, 137 R

(56) References Cited

U.S. PATENT DOCUMENTS 6,582,097 B2 * 6/2003 Chang .......................... 362/253

\* cited by examiner

Primary Examiner—Thomas M. Sember
Assistant Examiner—Bao Q. Truong
(74) Attorney, Agent, or Firm—Brinks Hofer Gilson & Lione

(57) ABSTRACT

A three-in-one handheld lighting device includes a casing unit, a torch unit, a whistle unit, and a thermometer unit. The torch unit includes actuating and press pieces, a lamp member having first and second leg terminals, and a battery unit having positive and negative terminals. The torch unit is in an off state when the actuating piece is disposed at a first position. The torch unit is in an on state when the actuating piece is moved to a second position, wherein the press piece pushes the first leg terminal to contact electrically the negative terminal such that the positive terminal is in electrical contact with the second leg terminal.

3 Claims, 10 Drawing Sheets

THREE-IN-ONE HANDHELD LIGHTING DEVICE

BACKGROUND OF THE INVENTION

1. Field of the Invention

The invention relates to a handheld lighting device, more particularly to a three-in-one handheld lighting device.

2. Description of the Related Art

Referring to FIG. 1, a conventional handheld lighting device 10 is shown to include a casing unit 11, a lamp member 12 mounted in and projecting out of the casing unit 11, a control unit 13 to control on and off conditions of the lamp member 12, and a battery unit (not shown) that is mounted inside the casing unit 11 and that can make and brake contact with the legs of the lamp member 12. Although the conventional handheld lighting device 10 is easy to carry and can provide lighting, it has a limited number of functions, and is not suitable for outdoor activities, such as mountain climbing or camping.

SUMMARY OF THE INVENTION

Therefore, the object of the present invention is to provide a three-in-one handheld lighting device that is capable of overcoming the aforementioned drawbacks of the prior art.

According to this invention, a three-in-one handheld lighting device comprises a casing unit, a torch unit, a whistle unit, and a thermometer unit. The casing unit includes upper and lower casing members. The upper casing member has a top wall, an upper surrounding wall that extends downwardly from a periphery of the top wall and that cooperates with the top wall to define an upper receiving space, and a partition wall that divides the upper receiving space into a torch receiving chamber and an air chamber opposite to the torch receiving chamber in a longitudinal direction. The top wall is formed with an elongate switch receiving hole that is proximate to the partition wall and that extends in the longitudinal direction. The upper surrounding wall is formed with a lamp hole distal from the partition wall. The lower casing member is attached to a lower end of the upper surrounding wall of the upper casing member, and has a bottom wall and a lower surrounding wall that extends upwardly from a periphery of the bottom wall. The bottom wall has an outer wall surface formed with a thermometer receiving cavity. The torch unit is disposed in the torch receiving chamber, and includes an operating member, a light emitting diode lamp member, an insulating member, a battery unit, and a cover body. The operating member is provided for controlling lighting of the torch unit, and includes a press piece and an actuating piece that extends upwardly and integrally from the press piece and that protrudes from the casing unit through the switch receiving hole. The press piece has a bottom surface formed with a limiting groove extending in a direction parallel to the switch receiving hole, and a retaining groove formed above and in communication with the limiting groove. The light emitting diode lamp member is disposed in the lamp hole, and has a head portion and a pair of spaced-apart first and second leg terminals connected to the head portion. The first leg terminal is positioned inside the limiting groove, and has a protrusion that engages removably and slidably the retaining groove. The insulating member is disposed between the first and second leg terminals, and has a connecting piece and two supporting pieces that extend respectively and integrally from opposite ends of the connecting piece and that abut respectively against the first and second leg terminals. The battery unit is disposed between the supporting pieces, and has positive and negative terminals that are spaced respectively apart from the second and first leg terminals. The cover body is provided for covering the torch receiving chamber and for supporting the second leg terminal. When the actuating piece of the operating member is disposed at a first position, the protrusion is positioned in the retaining groove, and the first and second leg terminals of the lamp member are spaced respectively apart from the negative and positive terminals of the battery unit so that the torch unit is in an off state. When the actuating piece is moved along the switch receiving hole to a second position, the protrusion is removed from the retaining groove so that the press piece pushes the first leg terminal to contact electrically the negative terminal of the battery unit such that the positive terminal is in electrical contact with the second leg terminal of the lamp member, thereby putting the torch unit in an on state. The whistle unit includes a semi-circular air inlet formed in the upper surrounding wall and disposed opposite to the lamp hole in the longitudinal direction, to a curved air resonant seat cooperating with the air inlet to form a resonant space in the air chamber, and an air outlet provided in the top wall to permit releasing of air that is blown into the air chamber, thereby generating a whistling sound output. The thermometer unit is mounted securely in the thermometer receiving cavity, and includes a capillary rod secured in the thermometer receiving cavity, and a graduated chart provided on the outer wall surface of the lower casing member adjacent to the thermometer receiving cavity.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
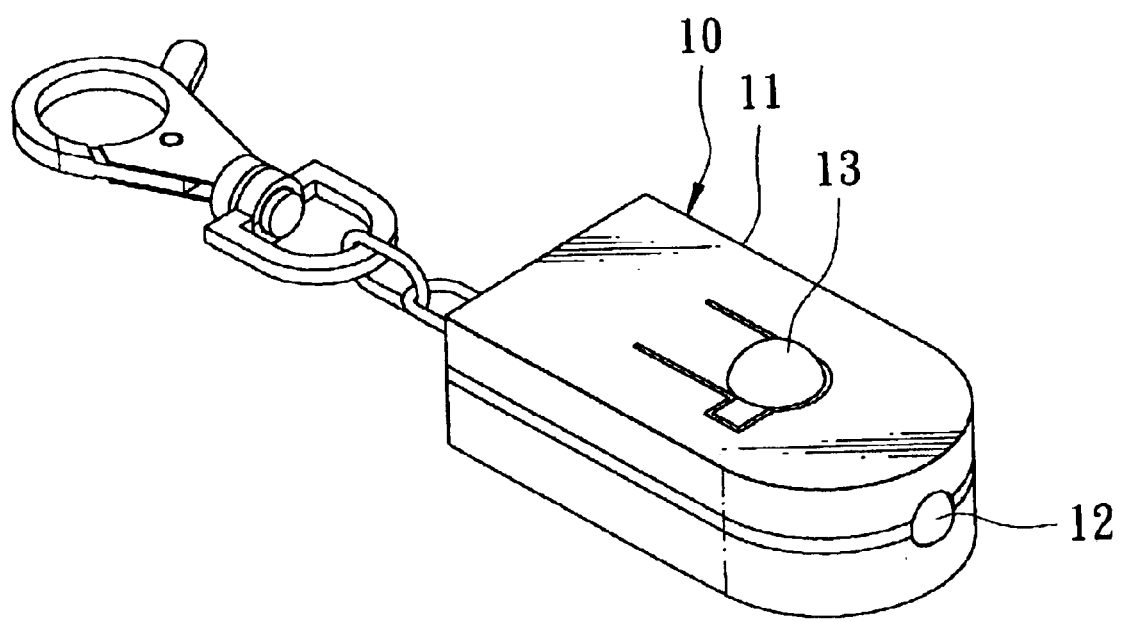
FIG. 1 is a perspective view of a conventional handheld lighting device.
Figure 2:
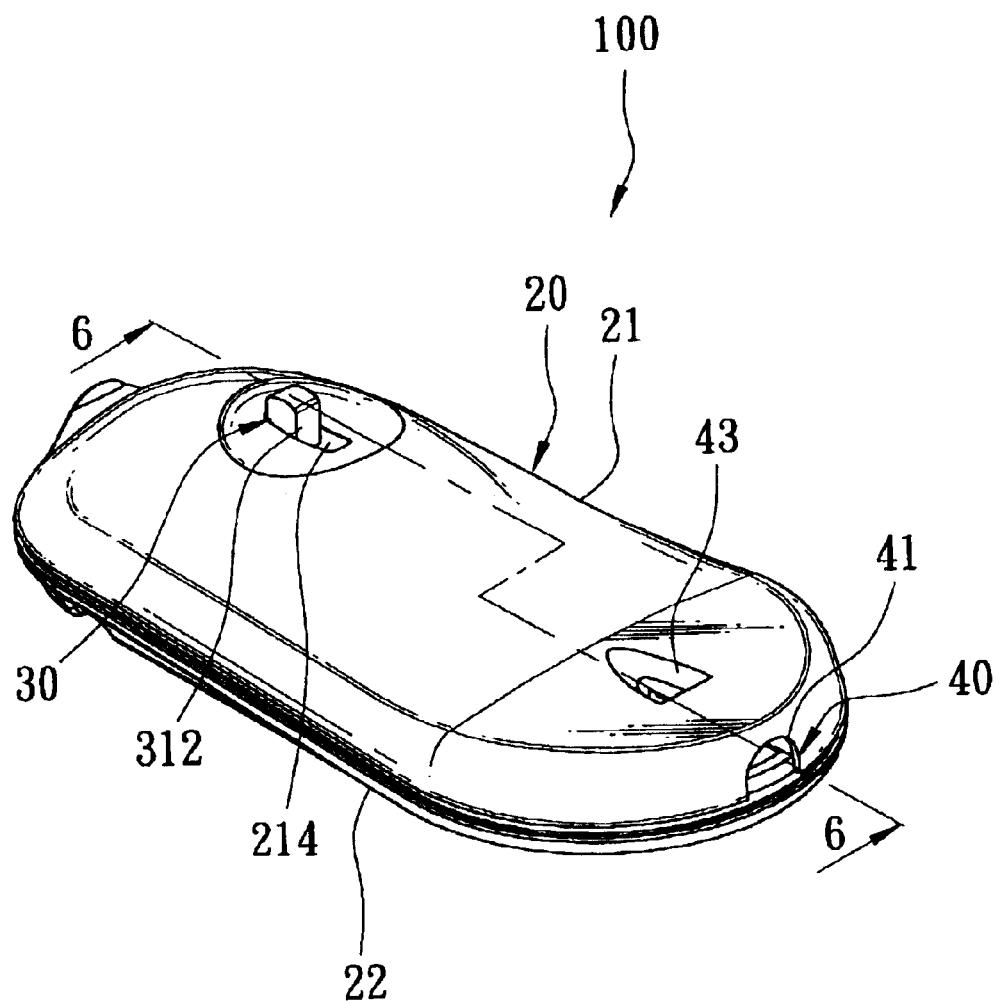
FIG. 2 is a perspective view of the preferred embodiment of a three-in-one handheld lighting device according to the present invention in an assembled state.
Figure 3:
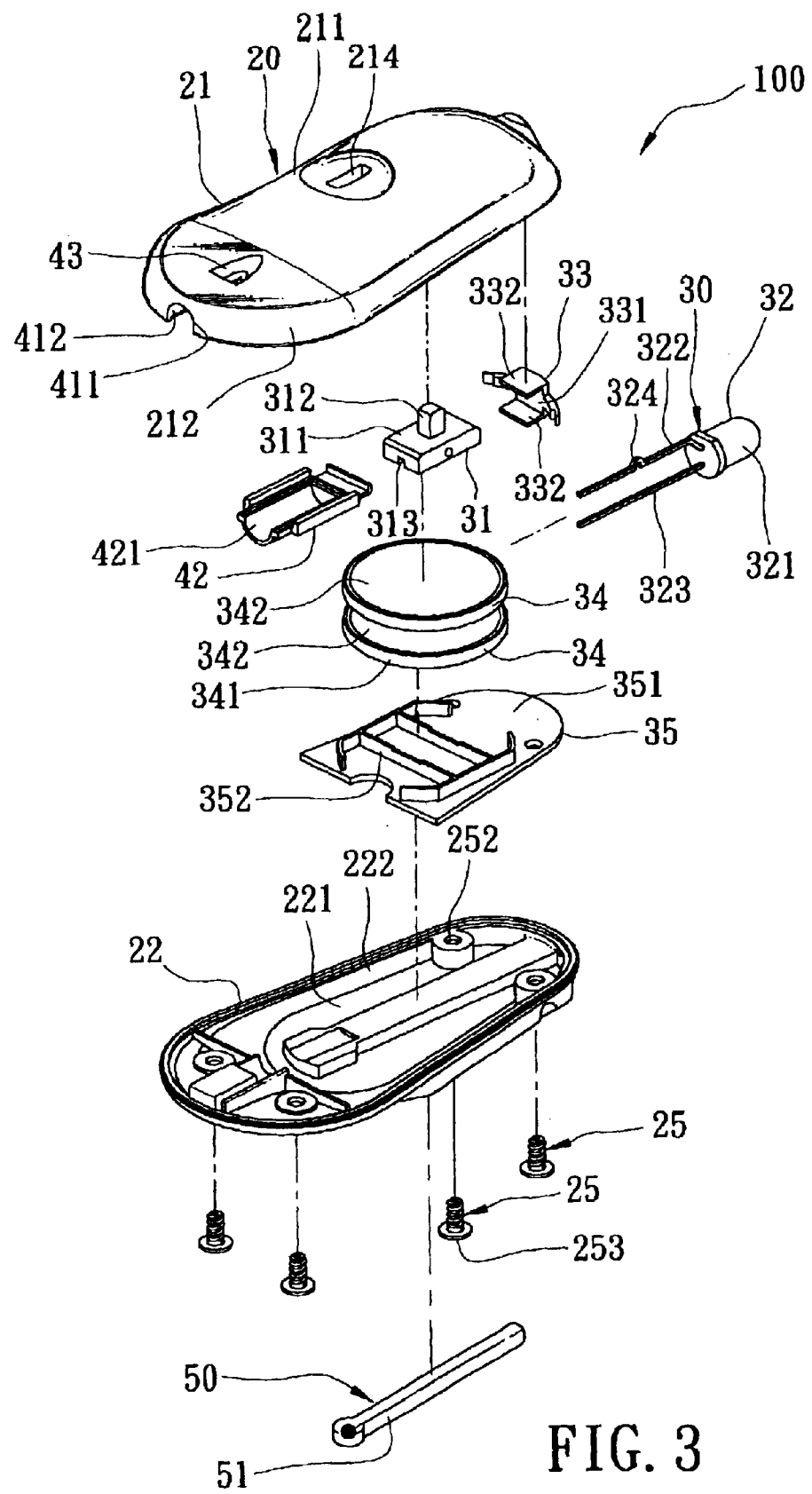
FIG. 3 is an exploded perspective view of the preferred embodiment.
Figure 4:
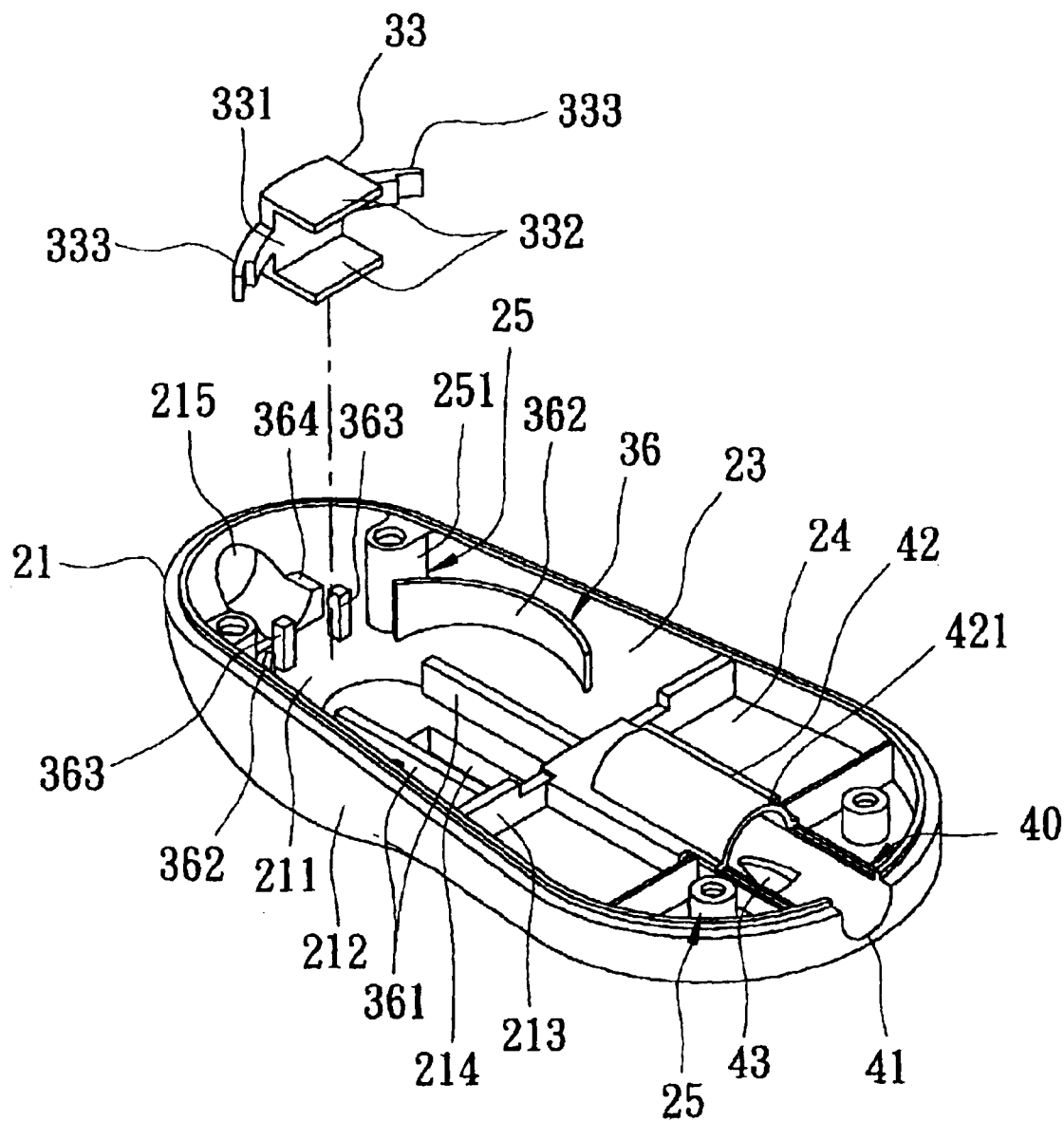
FIG. 4 is an exploded perspective view of an upper casing member and an insulating member of the preferred embodiment in an inverted state.
Figure 5:
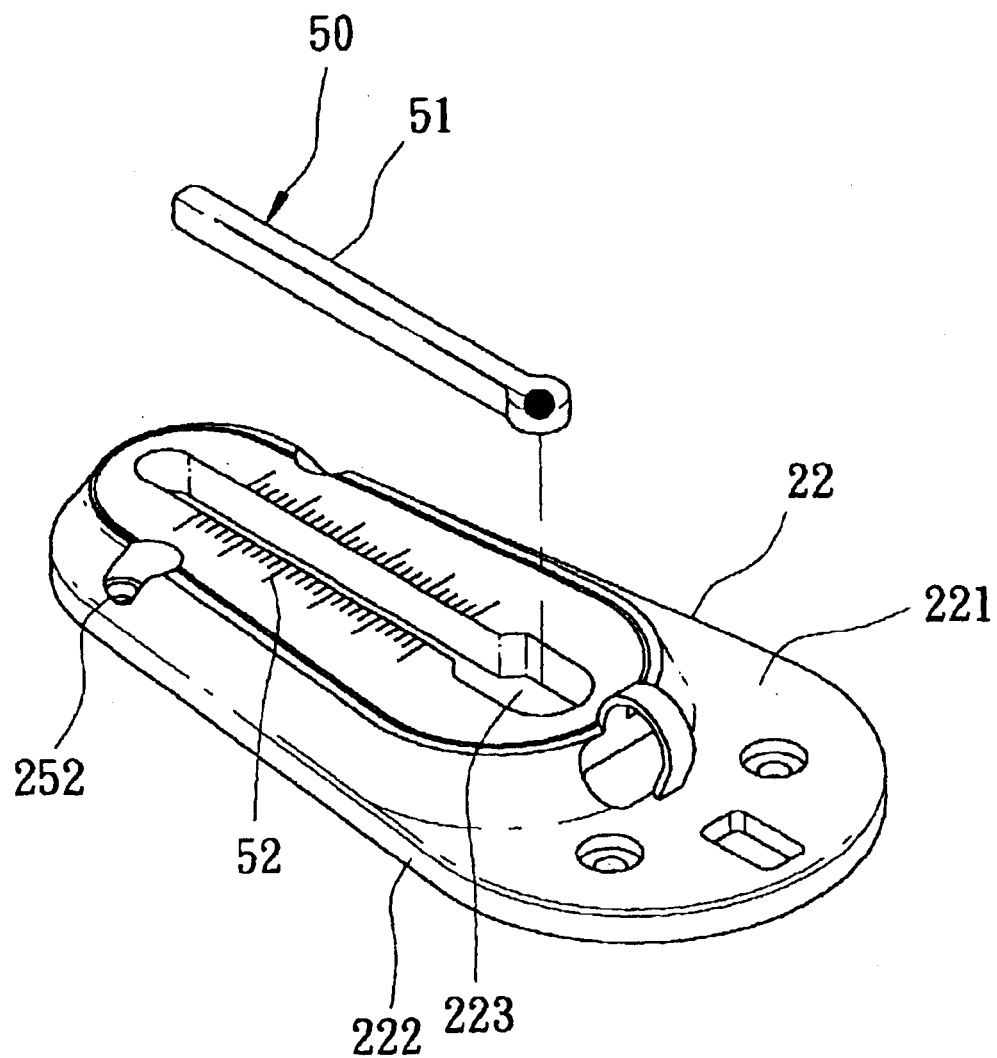
FIG. 5 is an exploded perspective view of a lower casing member and a thermometer unit of the preferred embodiment in an inverted state.

Referring to FIGS. 2 to 5, the preferred embodiment of a three-in-one handheld lighting device 100 according to the present invention is shown to comprise a casing unit 20, a torch unit 30, a whistle unit 40, and a thermometer unit 50 (see FIG. 5).

The casing unit 20 includes an upper casing member 21 and a lower casing member 22. The upper casing member 21 has a top wall 211, an upper surrounding wall 212 that extends downwardly from a periphery of the top wall 211 and that cooperates with the top wall 211 to define an upper receiving space, and a partition wall 213 that divides the upper receiving space into a torch receiving chamber 23 and an air chamber 24 opposite to the torch receiving chamber 23 in a longitudinal direction. The top wall 211 is formed with an elongate switch receiving hole 214 that is proximate to the partition wall 213 and that extends in the longitudinal direction. The upper surrounding wall 212 is formed with a lamp hole 215 distal from the partition wall 213. The lower casing member 22 is attached to a lower end of the upper surrounding wall 212 of the upper casing member 21, and has a bottom wall 221 and a lower surrounding wall 222 that extends upwardly from a periphery of the bottom wall 221. The bottom wall 221 has an outer wall surface formed with a thermometer receiving cavity 223 (see FIG. 5).

The casing unit 20 further includes four fastening assemblies 25 (see FIGS. 3 and 4). Each of the fastening assemblies 25 includes a lug 251 (see FIG. 4) formed on the upper casing member 21 and having a threaded hole, a screw hole 252 formed in the lower casing member 22 and aligned with the lug 251, and a threaded screw 253 extends through the screw hole 252 and that engages the threaded hole in the lug 251 so that the upper casing member 21 is connected to the lower casing member 22.

The torch unit 30 (see FIGS. 3 and 4) is disposed in the torch receiving chamber 23, and includes an operating member 31, a light emitting diode lamp member 32, an insulating member 33, a battery unit, and a cover body 35. The operating member 31 is provided for controlling lighting of the torch unit 30, and includes a press piece 311 and an actuating piece 312 that extends upwardly and integrally from an upper end of the press piece 311 and that protrudes from the casing unit 20 through the switch receiving hole 214. The press piece 311 has a bottom surface formed with a limiting groove 313 extending in a direction parallel to the switch receiving hole 214, and a retaining groove 314 (see FIG. 6) formed above and in communication with the limiting groove 313. The light emitting diode (LED) lamp member 32 is disposed in the lamp hole 215, and has a head portion 321 and a pair of spaced-apart first and second leg terminals 322, 323 connected to the head portion 321. The first leg terminal 322 is positioned inside the limiting groove 313, and has a protrusion 324 that engages removably and slidably the retaining groove 314. The insulating member 33 is disposed between the first and second leg terminals 322, 323, and has a connecting piece 331 and two supporting pieces 332 that extend respectively and integrally from opposite ends of the connecting piece 331 and that abut respectively against the first and second leg terminals 322, 323. Two extended sections 333 (see FIG. 4) project outwardly and respectively from two opposite lateral sides of the connecting piece 331. The battery unit, in this embodiment, includes two superimposed button cells 34 that are disposed between the supporting pieces 332 and that are connected in series, with the negative terminal 342 disposed above the positive terminal 341. The positive and negative terminals 341, 342 are spaced respectively apart from the second and first leg terminals 323, 322 of the lamp member 32. The cover body 35 (see FIG. 3) includes a cover plate 351 for covering the torch receiving chamber 23, and two parallel leg supporting ribs 352 formed on a side surface of the cover plate 351 for supporting the second leg terminal 323 of the lamp member 32.

The torch unit 30 further includes a retaining unit 36 (see FIG. 4). The retaining unit 36 includes two parallel straight limiting ribs 361 disposed respectively and fixedly on the top wall 211 and located on two sides of the switch receiving hole 214 for limiting movement of the press piece 311 of the operating member 31 between the limiting ribs 361, two curved ribs 362 for surrounding and retaining the battery unit 34 therebetween, and two parallel upright posts 363 disposed proximate to the lamp hole 215 for retaining the head portion 321 of the lamp member 32 therebetween and for securing the lamp member 32 on the upper casing member 21. Each extended section 333 of the insulating member 33 is inserted between a respective one of the curved ribs 362 and a respective one of the lugs 251 to secure the insulating member 33 on the upper casing member 21. The retaining unit 36 further includes a head support bracket 364 (see FIG. 4) that is formed adjacent to the lamp hole 215 for supporting the head portion 321 of the lamp member 32.

Figure 6:
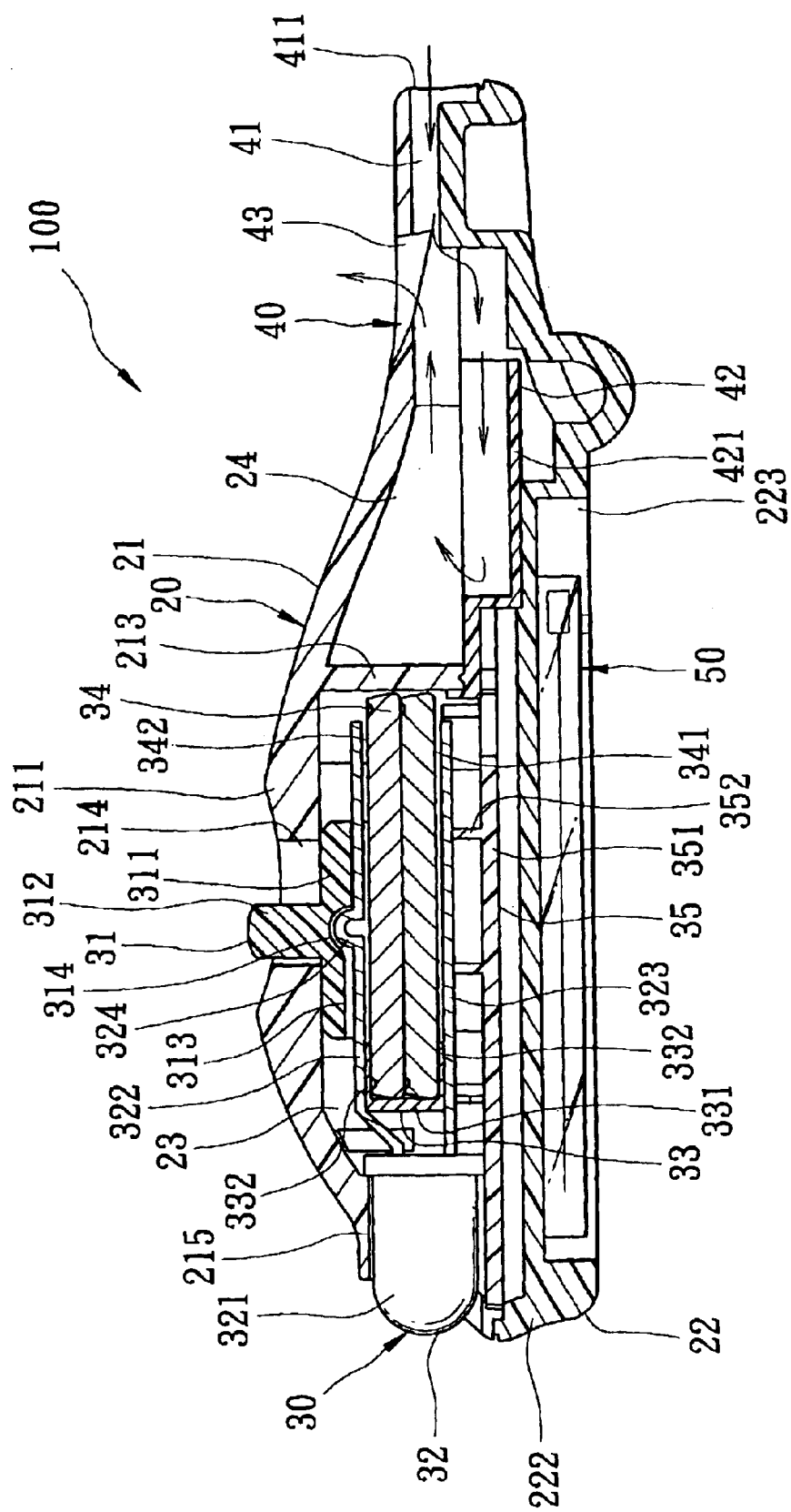
FIG. 6 is a sectional view of the preferred embodiment taken along line 6—6 of FIG. 2, illustrating an off condition of a torch unit.

When the actuating piece 312 of the operating member 31 is disposed at a first position shown in FIG. 6, the protrusion 324 is positioned in the retaining groove 314, and the first and second leg terminals 322, 323 of the lamp member 32 are spaced respectively apart from the negative and positive terminals 342, 341 of the battery unit 34 so that the torch unit 30 is in an off state.

Figure 8:
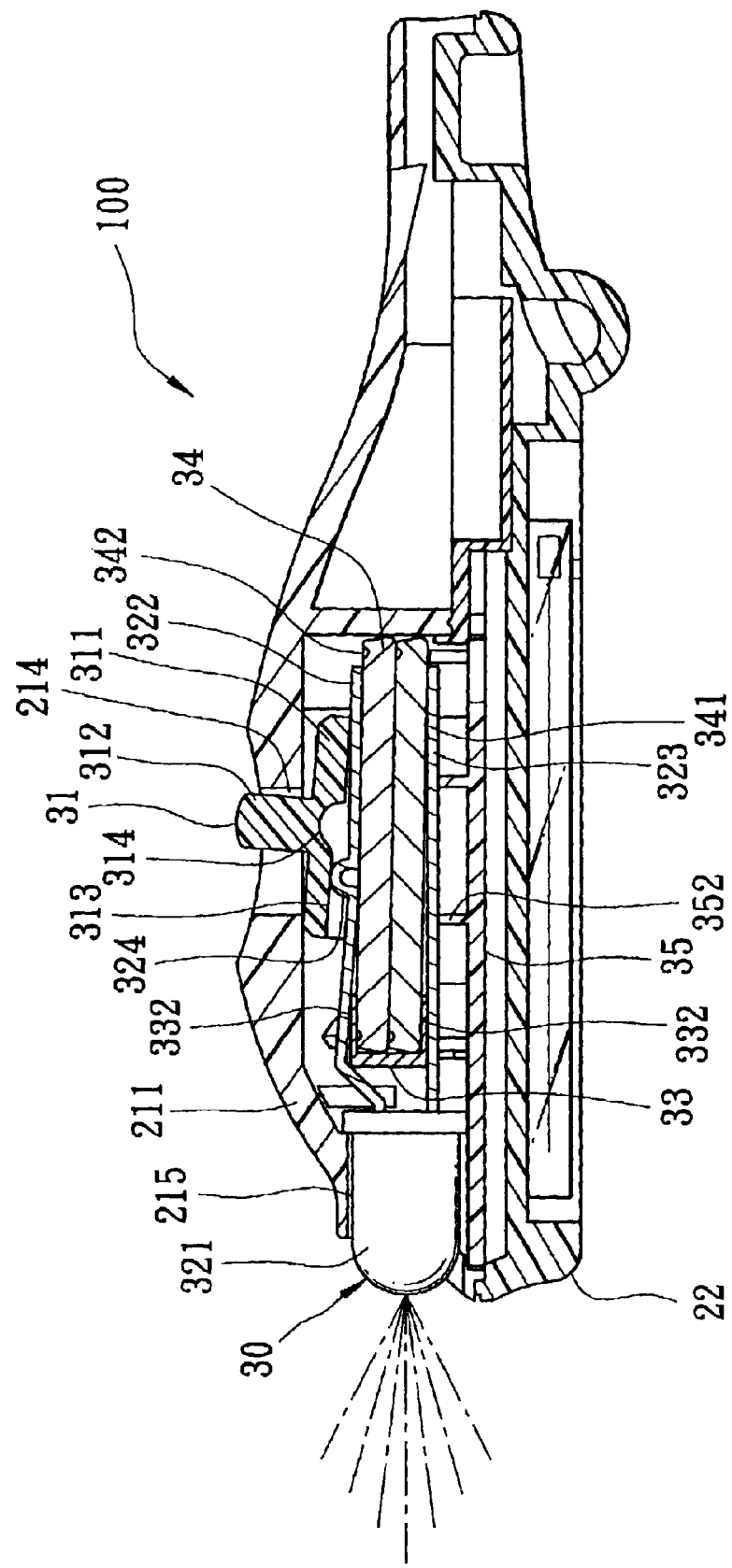
FIG. 8 is a view substantially similar to FIG. 6, illustrating the torch unit of the preferred embodiment in an on state.

When the actuating piece 312 is moved along the switch receiving hole 214 to a second position shown in FIG. 8, the protrusion 324 is removed from the retaining groove 314 so that the press piece 311 pushes the first leg terminal 322 to contact electrically the negative terminal 342 of the battery unit 34 such that the positive terminal 341 is in electrical contact with the second leg terminal 323 of the lamp member 32, thereby putting the torch unit 30 in an on state.

The whistle unit 40 (see FIGS. 4 and 6) includes a semi-circular air inlet 41 formed in the upper surrounding wall 212 and disposed opposite to the lamp hole 215 in the longitudinal direction, a curved air resonant seat 42 cooperating with the air inlet 41 to form a resonant space in the air chamber 24 in a known manner, and an air outlet 43 formed in the top wall 211 to permit releasing of air that is blown into the air chamber 24, thereby generating a whistling sound output. The air resonant seat 42 (see FIGS. 3 and 4) is disposed fixedly on the upper casing member 21, and has a curved portion 421 that extends away from the top wall 211.

The thermometer unit 50 (see FIGS. 3 and 5) is mounted securely in the thermometer receiving cavity 223, and includes a capillary rod 51 secured in the thermometer receiving cavity 223, and a graduated chart 52 provided on the outer wall surface of the lower casing member 22 adjacent to the thermometer receiving cavity 223.

Referring to FIG. 6, when the torch unit 30 is in an unused state, that is, in the first position, the protrusion 324 engages the retaining groove 314 such that the first and second leg terminals 322, 323 of the lamp member 32 are not in contact with the negative and positive terminals 342, 341 of the button cells 34 in view of the two supporting pieces 332 of the insulating member 33, thereby preventing unintentional turning-on of the torch unit 30.

Figure 7:
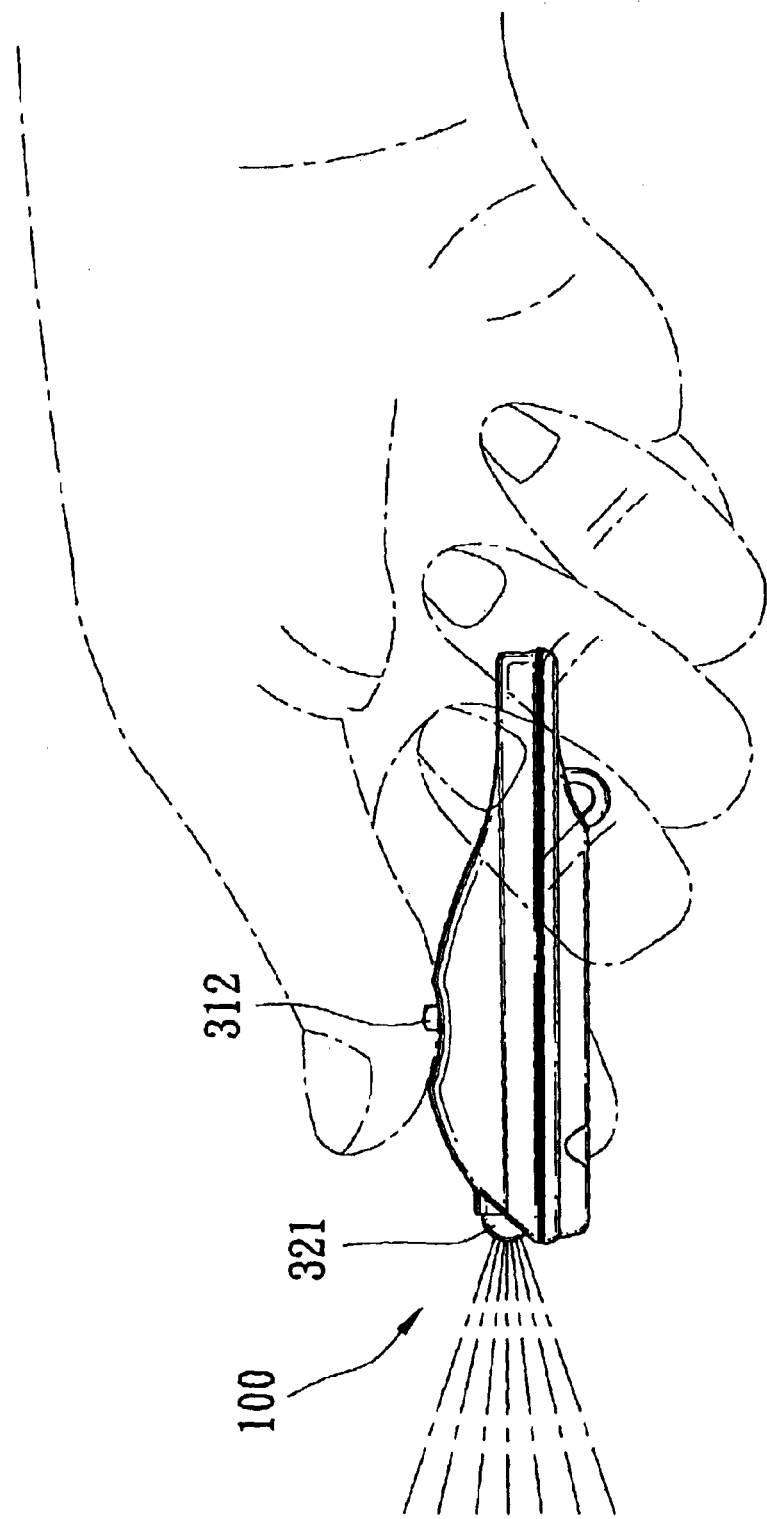
FIG. 7 illustrates the preferred embodiment in a state of use.

Referring to FIGS. 7 and 8, when the actuating piece 312 of the operating member 31 of the torch unit 30 is operated by the user's thumb to move to the second position, the protrusion 324 moves away from the retaining groove 314 and abuts against a wall defining the limiting groove 313 such that one end of the press piece 311 is higher than the other end. At this time, the higher end of the press piece 311 abuts against an inner surface of the top wall 211, while the lower end of the press piece 311 pushes the first leg terminal 322 toward the lower casing member 22 so that the first and second leg terminals 322, 323 contact electrically and respectively the negative and positive terminals 342, 341 of the button cells 34. As such, electrical connection between the lamp member 32 and the battery unit is formed, thereby permitting the head portion 321 of the lamp member 32 to emit light rays and to achieve the lighting purpose of the handheld lighting device 100.

Referring once again to FIG. 6, when a current of air enters the air inlet 41, it will flow into the air resonant seat 42, and out of the air outlet 43, thereby producing a whistling sound output, which is useful during an emergency situation to protect one's safety and to ask for help.

Figure 9:
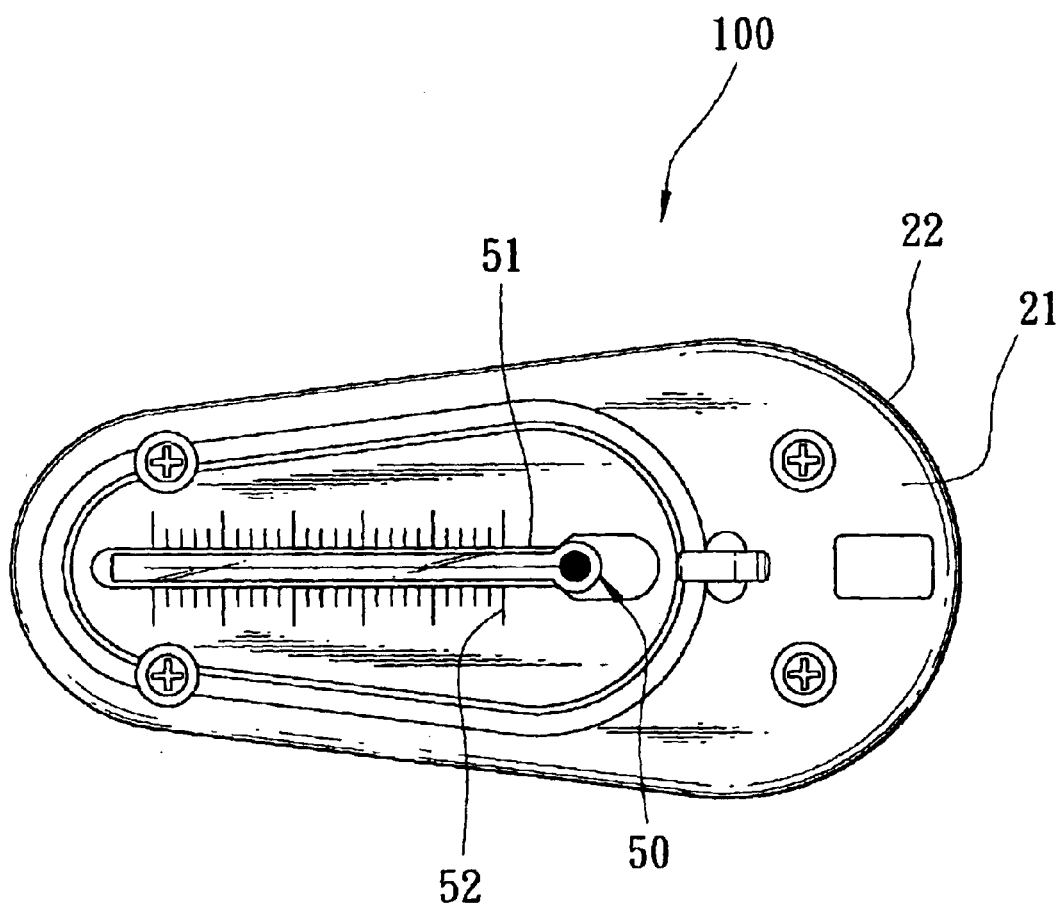
FIG. 9 illustrates another use of the preferred embodiment.

Referring to FIG. 9, the thermometer unit 50 can give an indication of ambient temperature.

Figure 10:
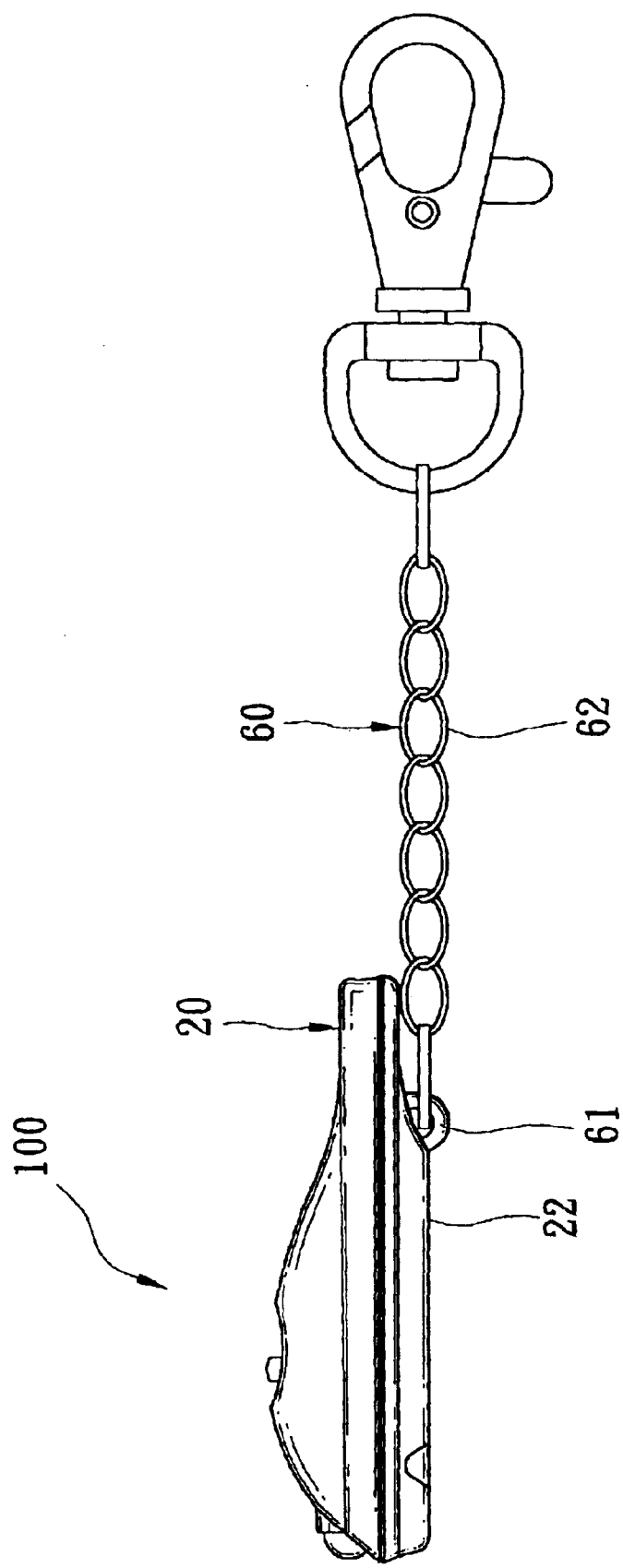
FIG. 10 illustrates yet another use of the preferred embodiment.

Referring to FIG. 10, the preferred embodiment can further comprise a hanging unit 60. The hanging unit 60 includes a ring projection 61 formed fixedly on the lower casing member 22 of the casing unit 20, and a keychain 62 fastened to the ring projection 61.

From the aforementioned description of the preferred embodiment of the three-in-one handheld lighting device 100 of the present invention, it is apparent that the object of the present invention is met.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A three-in-one handheld lighting device comprising:
   a casing unit including
      an upper casing member having a top wall, an upper surrounding wall that extends downwardly from a periphery of said top wall and that cooperates with said top wall to define an upper receiving space, and a partition wall that divides said upper receiving space into a torch receiving chamber and an air chamber opposite to said torch receiving chamber in a longitudinal direction, said top wall being formed with an elongate switch receiving hole that is proximate to said partition wall and that extends in the longitudinal direction, said upper surrounding wall being formed with a lamp hole distal from said partition wall, and
      a lower casing member attached to a lower end of said upper surrounding wall of said upper casing member, and having a bottom wall and a lower surrounding wall that extends upwardly from a periphery of said bottom wall, said bottom wall having an outer wall surface formed with a thermometer receiving cavity;
   a torch unit disposed in said torch receiving chamber and including
      an operating member for controlling lighting of said torch unit, and including a press piece and an actuating piece that extends upwardly and integrally from said press piece and that protrudes from said casing unit through said switch receiving hole, said press piece having a bottom surface formed with a limiting groove extending in a direction parallel to said switch receiving hole, and a retaining groove formed above and in communication with said limiting groove,
      a light emitting diode lamp member disposed in said lamp hole, and having a head portion and a pair of spaced-apart first and second leg terminals connected to said head portion, said first leg terminal being positioned inside said limiting groove and having a protrusion that engages removably and slidably said retaining groove,
      an insulating member disposed between said first and second leg terminals, and having a connecting piece and two supporting pieces that extend respectively and integrally from opposite ends of said connecting piece and that abut respectively against said first and second leg terminals,
      a battery unit disposed between said supporting pieces, and having positive and negative terminals that are spaced respectively apart from said second and first leg terminals, and
      a cover body for covering said torch receiving chamber and for supporting said second leg terminal, said actuating piece of said operating member being disposed at a first position, wherein said protrusion is positioned in said retaining groove, said first and second leg terminals of said lamp member are spaced respectively apart from said negative and positive terminals of said battery unit so that said torch unit is in an off state, said actuating piece being movable along said switch receiving hole to a second position, wherein said protrusion is removed from said retaining groove so that said press piece pushes against said first leg terminal to contact electrically said negative terminal of said battery unit such that said positive terminal is in electrical contact with said second leg terminal of said lamp member, thereby putting said torch unit in an on state;
   a whistle unit including a semi-circular air inlet formed in said upper surrounding wall and disposed opposite to said lamp hole in the longitudinal direction, a curved air resonant seat cooperating with said air inlet to form a resonant space in said air chamber, and an air outlet provided in said top wall to permit releasing of air that is blown into said air chamber, thereby generating a whistling sound output; and
   a thermometer unit mounted securely in said thermometer receiving cavity, and including a capillary rod secured in said thermometer receiving cavity and a graduated chart provided on said outer wall surface of said lower casing member adjacent to said thermometer receiving cavity.

2. The three-in-one handheld lighting device of claim 1, wherein said torch unit further includes a retaining unit, said retaining unit including two parallel straight limiting ribs disposed respectively and fixedly on said top wall and located on two sides of said switch receiving hole for limiting movement of said press piece of said operating member between said limiting ribs, two curved ribs for surrounding and retaining said battery unit therebetween, and two parallel upright posts disposed proximate to said lamp hole for retaining said head portion of said lamp member therebetween.

3. The three-in-one handheld lighting device of claim 2, further comprising a hanging unit, which includes a ring projection formed fixedly on said lower casing member and a keychain fastened to said ring projection.

* * * * *